Sept. 10, 1940.  W. F. JACKSON  2,214,375
THERMOSTATIC SHUTOFF VALVE
Filed May 29, 1939
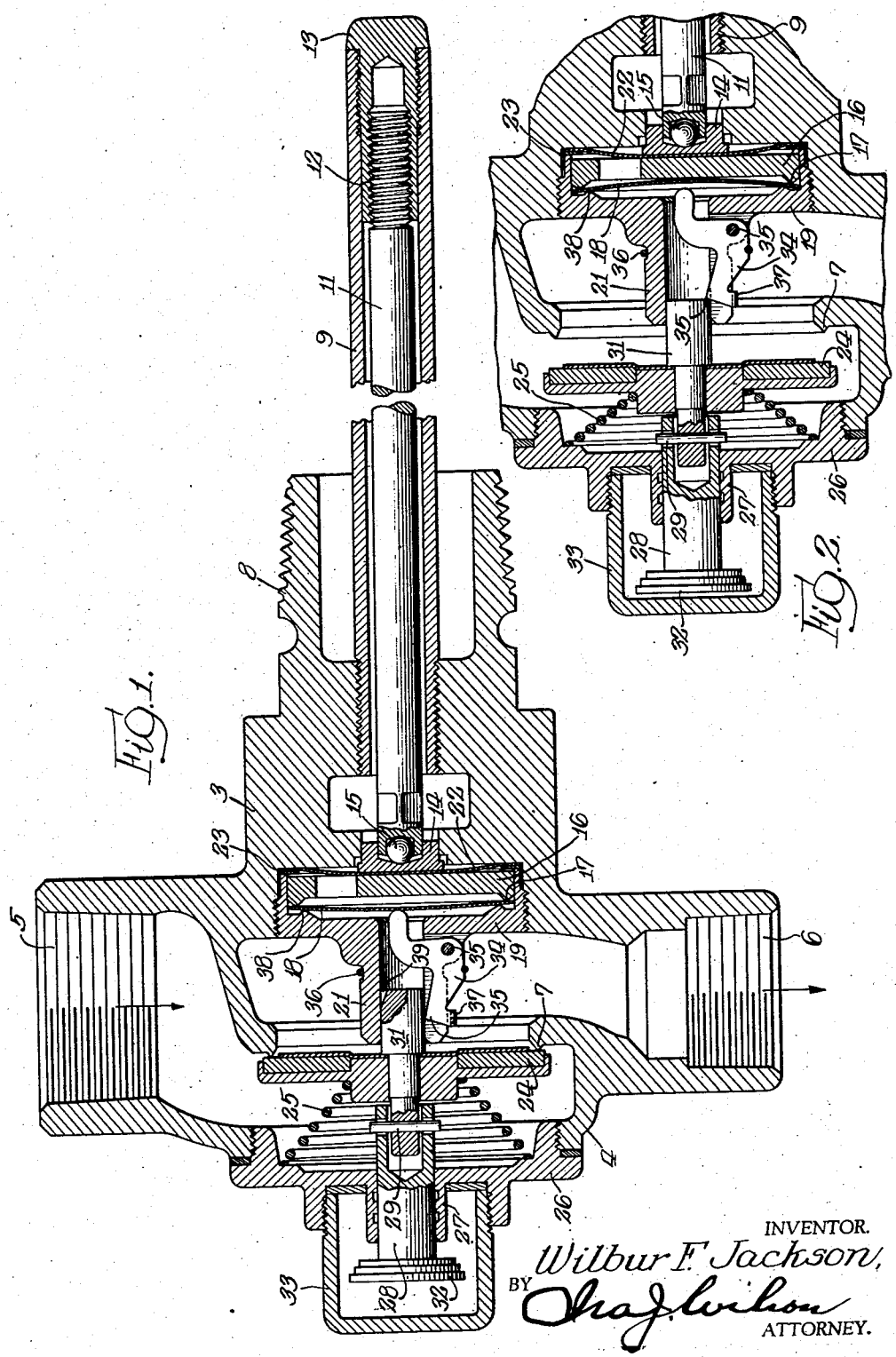
INVENTOR.
Wilbur F. Jackson,
BY Chas J. Wilson
ATTORNEY.

Patented Sept. 10, 1940

2,214,375

UNITED STATES PATENT OFFICE 2,214,375

THERMOSTATIC SHUTOFF VALVE

Wilbur F. Jackson, Lynwood, Calif., assignor to Grayson Heat Control, Ltd., Lynwood, Calif., a corporation of California Application May 29, 1939, Serial No. 276,402

3 Claims. (Cl. 137—139)

This invention relates in general to thermostatic valves and more particularly to a high temperature shutoff valve designed to automatically close when a temperature of a predetermined height has been reached in the medium being heated and thereby shut off the fuel supply so as to preclude overheating of the medium.

While the principles of my invention may be utilized in connection with valves for various purposes, they are here exemplified for illustrative purposes as embodied in a water heater, high temperature shutoff valve.

Automatic water heaters which employ gaseous fuel for heating purposes are thermostatically controlled so that the fuel is automatically turned on when a predetermined low temperature of the water in the tank has been reached and is automatically shut off when a predetermined high temperature, for which the control is set, has been reached, the temperature of the water being thereby normally maintained at a temperature between the limits for which the thermostatic control valve is set.

In the event, however, that the thermostatic control valve should for any reason fail to function when the predetermined high temperature of the heated water has been attained, the heating burners will continue to operate, thereby overheating the water and, if continued long enough, will produce in the storage tank a dangerously high steam pressure which may result in a rupture of the tank with disastrous results.

The purpose of my present invention is to provide a safety shutoff valve which will automatically shut off the fuel supply to the heating burners when a predetermined high temperature, for which the valve is set, has been attained, thereby preventing dangerous overheating of the water in the tank. Such safety valve is of course set at a higher temperature than the maximum temperature for which the control valve is set so that the safety valve only operates under unusual conditions and as an emergency measure. When the safety valve closes, it remains in closed position until manually opened. Consequently, when the safety valve is once closed, no decrease in temperature in the water in the tank will cause a fuel flow to the burners until the safety valve has been manually reset.

Another purpose of my invention is to provide a valve of this character which can be manually closed when desired irrespective of temperature conditions so that, for instance, the apparatus may be shipped when the safety valve is closed to thereby preclude any gas flow to the burners when the apparatus is installed and connected up until the safety valve has been manually opened.

Another purpose of my invention is to provide a device which will be simple in construction, economical to manufacture, and reliable and durable in operation.

For the purpose of facilitating an understanding of my invention, I have disclosed on the accompanying drawing a preferred embodiment thereof, from an inspection of which when considered in connection with the following description my invention and its inherent advantages should be understood and appreciated.

Referring to the drawing:

Fig. 1 is a longitudinal sectional view through a valve constructed in accordance with my invention; and Fig. 2 is a similar view showing the position of the parts when the valve is in open position.

On the drawing, reference character 3 indicates generally a body formed to provide a valve casing 4 having an inlet 5, an outlet 6, a valve seat 7, and a threaded spud 8 adapted to be mounted in a suitably tapped opening in the side of a water heater storage tank. A thermostat projecting from this spud into the tank comprises a tube 9 of copper or other material having a relatively high co-efficient of expansion and a rod 11 therein having a relatively low co-efficient of expansion, and adjustably associated through a threaded connection 12 with a plug 13 closing the outer end of the tube. The thermostat structure described is of standard construction, but may be varied as desired.

The inner end of rod 11 carries a cap 14 and a ball 15 interposed between the cap and the rod, said cap being adapted to actuate a thrust member 16 having a marginal rib 17 for actuating a clicker disk 18. The body 3 is recessed to accommodate the pusher 16, which is telescopically disposed within the annular skirt of a member 19 threaded into the recess of the body, and carrying an outwardly projecting valve stem guide 21. Leakage of gas along the thermostat is prevented by a sealing disk 22 clamped around its margin by a washer 23 which is held by the edge of the skirt projecting from the member 19.

The valve 24 is urged toward the seat 7 by an expansion spring 25 interposed between the valve and the cap 26 closing the valve casing. This cap is formed to provide a central guide 27 for a stem 28 loosely connected through a pin 29 with the reduced outer end of the valve stem 31, the outer end of stem 28 being provided with a head 32 adapted to be grasped by the fingers and pulled to open the valve from the position shown in Fig. 1 to that shown in Fig. 2. To insure against gas leakage, the stem 28 is housed within a cap 33 removably threaded to the closure 26. Removal of the cap 33 permits access to the head 32 for withdrawal of the valve from its seat.

The valve stem 31 is reciprocably disposed within and guided by the tubular guide 21 projecting from the member 19. In a slot formed in one side of the guide 21, a bell crank-shaped trigger 34 is fulcrumed upon a pin 35. One end of this trigger is positioned centrally of and in proximity to the outer face of the clicker disk 18, and the opposite end is shaped to provide an abutment or shoulder 35 which is normally urged by a spring ring 36 into the position shown in Fig. 2, wherein the shoulder 35 projects into the bore of the guide 21. The extent of such inward projection is limited by a tang 37 projecting laterally from the trigger so that it is unable to enter the slot in which the trigger is disposed.

Under normal conditions the parts assume the position shown in Fig. 2, wherein the valve having been lifted from its seat through the medium of the head 32, the shoulder 35 of the trigger abuts the inner end of the valve stem 31 so as to hold the valve in open position against the action of its closing spring 25. The clicker disk 18, which is normally outwardly convex, as illustrated in Fig. 1, is held in reverse or outwardly concave position, as illustrated in Fig. 2, by the pressure of the annular rib 17 on the pusher 16 against the margin of the clicker disk and outside the annular rib 38 formed on the member 19. The contraction of the thermostatic tube 9 maintains this pressure and holds the clicker disk in the position of Fig. 2 until under the influence of an abnormal temperature, tube 9 expands sufficiently to relieve this pressure, whereupon clicker disk 18 snaps over into its normal position illustrated in Fig. 1, thereby actuating the trigger to withdraw shoulder 35 from beneath the inner end of valve stem 31, thereby permitting the valve to snap closed under the influence of spring 25. The valve will then remain closed until manually reopened, as previously explained.

In order to enable the valve to be manually closed for purposes of shipment or for any other desired reason, a tapered groove 39 is formed in the inner end of the valve stem 31. By rotating the valve and its stem until this groove 39 is aligned with the trigger shoulder 35, the valve member may be closed by pressing inwardly on the head 32 if the pressure of spring 25 is alone insufficient to move the stem inwardly.

It will be apparent from the foregoing that I have provided a valve of the character indicated which will be held in open position by the trigger until released by the thermostat under the influence of an excessive temperature. When such temperature is reached, the snap action of the clicker disk will kick the trigger from the path of the valve stem and permit an immediate closure of the valve. Should it be desirable to close the valve irrespective of temperature conditions, provision for the accomplishment of that result is made.

The structural details illustrated and described may be varied within wide limits without exceeding the scope of my invention as defined in the following claims.

I claim:

1. In a thermostatic valve, the combination of a valve, a spring for closing the same, manually operable means for opening the valve, a valve stem, a guide therefor, a latch pivoted on said guide in position to present a shoulder in the path of said stem to hold the valve in open position, and thermostatic means for actuating said latch, said stem being provided with a slot for the reception of said latch to permit manual closure of the valve independently of the thermostatic means.

2. In a thermostatic valve, the combination of a valve, a spring for closing the valve, manually operable means for opening the valve, a valve stem, a guide therefor, a latch for holding the valve in open position, thermostatic means for controlling the latch, and means on the valve stem for rendering said latch inoperable to thereby permit manual closing of the valve independently of said thermostatic means.

3. In a thermostatic valve, the combination of a valve, a spring for closing the same, manually operable means for opening the valve, a valve stem, a guide therefor, a latch pivoted on said guide in position to present a shoulder in the path of said stem to hold the valve in open position, said stem being provided with an inclined surface registerable with said latch to permit manual closing of the valve, and thermostatic means for releasing said latch.

WILBUR F. JACKSON.